United States Patent

Wang et al.

[11] Patent Number: 6,055,852
[45] Date of Patent: May 2, 2000

[54] METHOD AND APPARATUS FOR ESTIMATION OF RELATIVE CYLINDER COMPRESSION BALANCE BY CRANKING SPEED ANALYSIS

[75] Inventors: Yue Yun Wang; Paul R. Miller; George G. Zhu, all of Columbus, Ind.

[73] Assignee: Cummins Engine Company, Inc., Columbus, Ind.

[21] Appl. No.: 09/187,675

[22] Filed: Nov. 6, 1998

[51] Int. Cl.$^7$ .................................................. G01M 15/00
[52] U.S. Cl. ................................................................ 73/116
[58] Field of Search .................................. 73/116, 117.3, 73/118.2

[56] References Cited

U.S. PATENT DOCUMENTS

| | | |
|---|---|---|
| 3,972,230 | 8/1976 | Hanson et al. . |
| 3,979,960 | 9/1976 | Schwartz ................................... 73/744 |
| 4,050,296 | 9/1977 | Benedict . |
| 4,085,611 | 4/1978 | Schwartz ................................... 73/115 |
| 4,179,922 | 12/1979 | Bouverie et al. . |
| 4,292,841 | 10/1981 | Wesley . |
| 4,295,363 | 10/1981 | Buck et al. . |
| 4,348,893 | 9/1982 | Hendrix et al. . |
| 4,539,841 | 9/1985 | Schroeder et al. ......................... 73/116 |
| 4,635,603 | 1/1987 | Hara ........................................ 123/383 |
| 5,138,874 | 8/1992 | Davis . |
| 5,791,314 | 8/1998 | Ito ........................................... 123/436 |

*Primary Examiner*—Max Noori
*Attorney, Agent, or Firm*—Woodard, Emhardt, Naughton Moriarty & McNett

[57] ABSTRACT

The present invention gathers and processes engine speed and position information gathered during cranking, without fuel injection or combustion, in order to derive a set of parameters that are shown to correlate very well with the presence of cylinder compression leakage. Using engine speed and position information from, for example, camshaft gear targets, crankshaft tonewheels, or the flywheel itself, etc., a parameter designated as "metric distance" between adjacent firing cylinder speed fluctuation pulses is determined. For engines with well-balanced cylinder compression, the values of the metric distances measured between all cylinders should be close to each other within a certain threshold. If a cylinder exhibits leakage, the metric distance of the cylinder from its adjacent firing cylinders will significantly exceed the threshold, thereby detecting a leaking cylinder. The method of the present invention also provides a relative estimation of the percentage compression loss from the leaking cylinder. This provides valuable information for service personnel to quickly determine the cause of engine delivering low power. In addition to the service application of the present invention, the present invention may also be used on a continuous or semi-continuous basis (for example, each engine startup) to provide a degree of prognostics or early warning of worsening cylinder compression balance.

15 Claims, 7 Drawing Sheets

METHOD AND APPARATUS FOR ESTIMATION OF RELATIVE CYLINDER COMPRESSION BALANCE BY CRANKING SPEED ANALYSIS

TECHNICAL FIELD OF THE INVENTION

The present invention generally relates to diagnostics for internal combustion engines and, more particularly, to a method and apparatus for estimation of relative cylinder compression balance by cranking speed analysis.

BACKGROUND OF THE INVENTION

In a multi-cylinder reciprocating internal combustion engine, there are differences in the amount of useful torque produced by each cylinder, even during normal operation. Small between-cylinder torque differences can cause rough idling and poor emissions performance. Large between-cylinder differences, such as those caused by damaged piston rings, burned valves, holes in the cylinder head and liners, etc., can cause extremely rough operation. The process for sensing these torque differences and using the information for compensation or diagnosis of engine operation is known as cylinder balancing.

In the prior art, the diagnosis of low engine power and individual cylinder power problems has typically required a combination of: 1) exhaust temperature measurements to isolate the faulty cylinder, 2) fuel injector changes and overhead resetting to further isolate the nature of the problem, and 3) partial engine disassembly to inspect sealing components such as valves, valve seats, piston rings, and liners. All of these methods are very labor intensive and therefore costly and inconvenient. There is therefore a need for a method which very quickly identifies individual cylinder compression problems with no hardware disassembly, which will lead to faster and more cost-effective diagnosis and repair, as well as early warning of worsening compression imbalance. The present invention is directed toward meeting this need.

SUMMARY OF THE INVENTION

The present invention gathers and processes engine speed and position information gathered during cranking, without fuel injection or combustion, in order to derive a set of parameters that are shown to correlate very well with the presence of cylinder compression leakage. Using engine speed and position information from, for example, camshaft gear targets, crankshaft tonewheels, or the flywheel itself, etc., a parameter designated as "metric distance" between adjacent firing cylinder speed fluctuation pulses is determined. For engines with well-balanced cylinder compression, the values of the metric distances measured between all cylinders should be close to each other within a certain threshold. If a cylinder exhibits leakage, the metric distance of the cylinder from its adjacent firing cylinders will significantly exceed the threshold, thereby detecting a leaking cylinder. The method of the present invention also provides a relative estimation of the percentage compression loss from the leaking cylinder. This provides valuable information for service personnel to quickly determine the cause of engine delivering low power. In addition to the service application of the present invention, the present invention may also be used on a continuous or semi-continuous basis (for example, each engine startup) to provide a degree of prognostics or early warning of worsening cylinder compression balance.

In one form of the invention, a method for detecting cylinder compression pressure loss in an internal combustion engine is disclosed comprising the steps of: cranking said engine without combustion; measuring a rotational speed of said engine during n cycles of said cranking; defining a first speed fluctuation pulse vector $X(\theta)$ as: $X(\theta)=[x_1, x_2 \ldots x_n]$, wherein $x_1 \ldots x_n$ comprise said rotational speed measurements made between a predetermined position of a first piston of said engine and said predetermined position of a second piston; defining a second speed fluctuation pulse vector $Y(\theta)$ as: $Y(\theta)=[y_1, y_2 \ldots y_n]$, wherein $y_1 \ldots y_n$ comprise said rotational speed measurements made between said predetermined position of said second piston and said predetermined position of a third piston; defining a third speed fluctuation pulse vector $Z(\theta)$ as: $Z(\theta)=[z_1, z_2 \ldots z_n]$, wherein $z_1 \ldots z_n$ comprise said rotational speed measurements made between said predetermined position of said third piston and said predetermined position of a fourth adjacently firing piston; determining a first metric distance between said first piston and said second piston as:

$$\text{said first metric distance} = \sqrt{\sum_{i=1}^{n}(x_i - y_i)^2};$$

determining a second metric distance between said second piston and said third piston as:

$$\text{said second metric distance} = \sqrt{\sum_{i=1}^{n}(y_i - z_i)^2};$$

and determining if a cylinder enclosing said second piston is exhibiting compression leakage by comparing said first and second metric distances to a predetermined threshold.

In a second form of the invention, a method for detecting cylinder compression loss in an internal combustion engine is disclosed, comprising the steps of: cranking said engine; measuring a rotational speed of said engine during n cycles of said cranking; defining a first speed fluctuation pulse vector $X(\theta)$ as: $X(\theta)=[x_1, x_2 \ldots x_n]$, wherein $x_1 \ldots x_n$ comprise said rotational speed measurements made between a predetermined position of a first piston of said engine and said predetermined position of a second piston; defining a second speed fluctuation pulse vector $Y(\theta)$ as: $Y(\theta)=[y_1, y_2 \ldots y_n]$, wherein $y_1 \ldots y_n$ comprise said rotational speed measurements made between said predetermined position of said second position and said predetermined position of a third piston; defining a third speed fluctuation pulse vector $Z(\theta)$ as: $Z(\theta)=[z_1, Z_2 \ldots z_n]$, wherein $z_1 \ldots Z_n$ comprise said rotational speed measurements made between said predetermined position of said third piston and said predetermined position of a fourth adjacently firing piston; determining a first metric distance between said first piston and said second piston as:

$$\text{said first metric distance} = \sqrt{\sum_{i=1}^{n}(x_i - y_i)^2};$$

determining a second metric distance between said second piston and said third piston as:

$$\text{said second metric distance} = \sqrt{\sum_{i=1}^{n}(y_i - z_i)^2};$$

and determining if a cylinder enclosing said second piston is exhibiting compression leakage by comparing said first and second metric distances to a predetermined threshold.

In a third form of the invention, a method for detecting cylinder compression pressure loss in an internal combustion engine is disclosed, comprising the steps of: cranking said engine without combustion; measuring a rotational speed of said engine during n cycles of said cranking; defining a first speed fluctuation pulse vector $X(\theta)$ as: $X(\theta)=[x_1, x_2, \ldots x_n]$, wherein $x_1 \ldots x_n$ comprise said rotational speed measurements made between a predetermined position of a first piston of said engine and said predetermined position of a second piston; defining a second speed fluctuation pulse vector $Y(\theta)$ as: $Y(\theta)=[y_1, y_2, \ldots y_n]$ wherein $y_1 \ldots y_n$ comprise said rotational speed measurements made between said predetermined position of said second position and said predetermined position of a third piston; determining a metric distance between said first piston and said second piston as: metric distance=$\theta^n_{i=1}(x_{1-y1})^2$; and determining if a first cylinder enclosing said first piston or a second cylinder enclosing said second piston is exhibiting compression leakage by comparing said metric distance to a predetermined threshold.

In a fourth form of the invention, a method for detecting cylinder compression pressure loss in an internal combustion engine is disclosed, comprising the steps of: cranking said engine without combustion; measuring a rotational speed of said engine during n cycles of said cranking; defining a first speed fluctuation pulse vector $X(\theta)$ as: $X(\theta)=[x_1, x_2, \ldots x_n]$, wherein $x_1 \ldots x_n$ comprise said rotational speed measurements made between a predetermined position of a first piston of said engine and said predetermined position of a second piston; defining a second speed fluctuation pulse vector $Y(\theta)$ as: $Y(\theta)=[y_1, y_2, \ldots y_n]$ wherein $y_1 \ldots y_n$ comprise said rotational speed measurements made between said predetermined position of said second position and said predetermined position of a third piston; determining $\overline{X}$ as the mean of X; determining $\overline{Y}$ as the mean of Y; determining $\sigma_x$ as the standard deviation of $X(\theta)$; determining $\sigma_Y$ as the standard deviation of $Y(\theta)$; determining a correlation coefficient of $X(\theta)$ and $(Y\theta)$ as:

$$\text{Corr. Coefficient}(X, Y) = \frac{\sum_{i=1}^{n}(x_i - \overline{X})\sum_{i=1}^{n}(y_i - \overline{Y})}{\sigma_x \sigma_y};$$

and determining if a first cylinder enclosing said first piston or a second cylinder enclosing said second piston is exhibiting compression leakage by comparing said correlation coefficient to 1.

In a fifth form of the invention, a method for detecting cylinder compression pressure loss in an internal combustion engine is disclosed, comprising the steps of: cranking said engine without combustion; measuring a rotational speed of said engine during n cycles of said cranking; defining a first speed fluctuation pulse vector $X(\theta)$ as: $X(\theta)=[x_1, x_2, \ldots x_n]$, wherein $x_1 \ldots x_n$ comprise said rotational speed measurements made between a predetermined position of a first piston of said engine and said predetermined position of a second piston; defining a second speed fluctuation pulse vector $Y(\theta)$ as: $Y(\theta)=[y_1, y_2, \ldots y_n]$, wherein $y_1 \ldots y_n$ comprise said rotational speed measurements made between said predetermined position of said second position and said predetermined position of a third piston; determining a correlation coefficient of $X(\theta)$ and $Y(\theta)$; and determining if a first cylinder enclosing said first piston or a second cylinder enclosing said second piston is exhibiting compression leakage by comparing said correlation coefficient to 1.0.

DETAILED DESCRIPTION OF THE PREFERRED EMBODIMENTS

Figure 1:
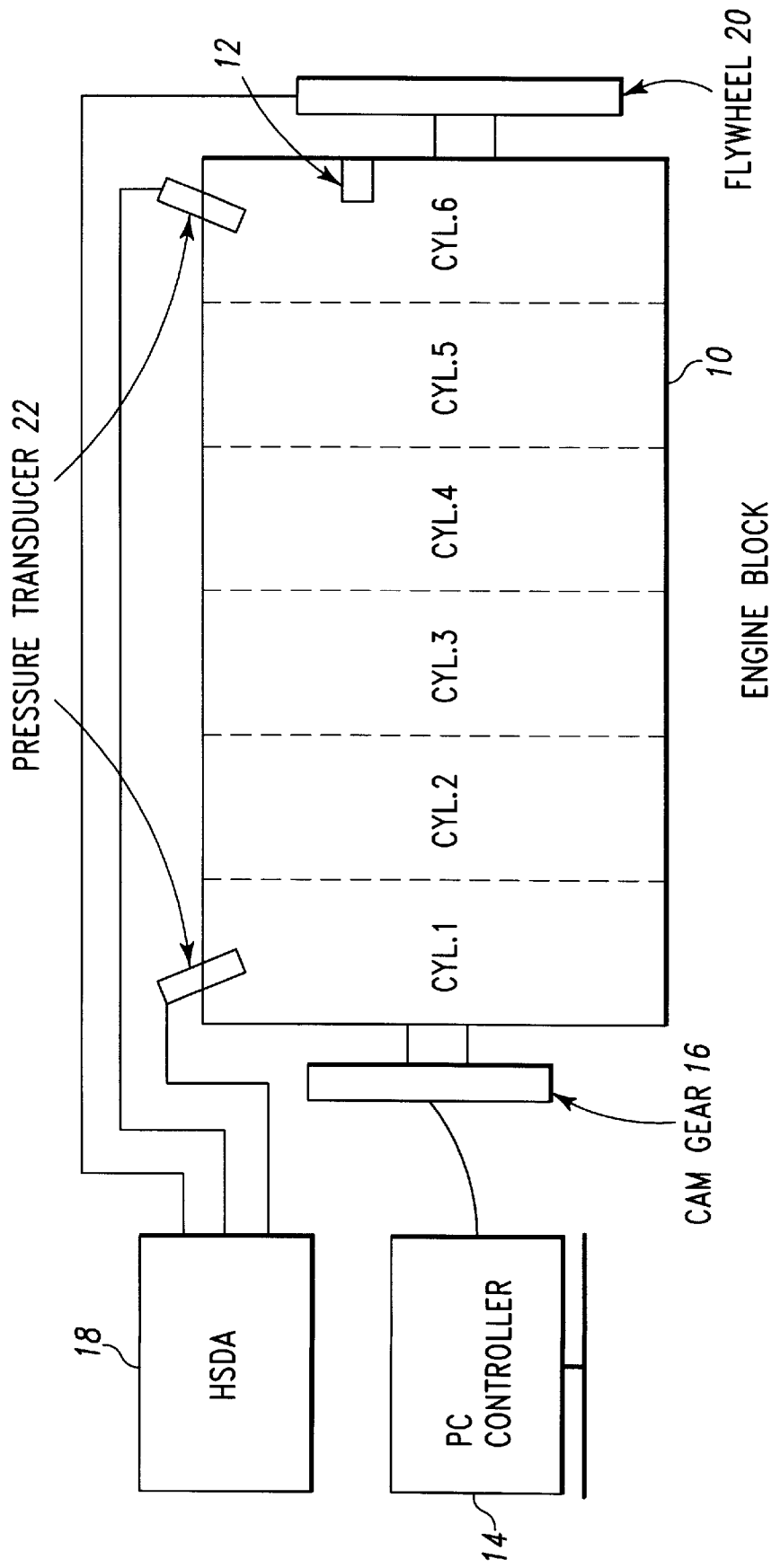
FIG. 1 is a schematic diagram of an experimental test setup used to illustrate the concepts of the present invention.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Cylinder compression balance is very critical for an internal combustion engine if the engine is to generate its rated power and to deliver the optimum fuel economy and emission characteristics. Leakage in the cylinder combustion chamber will cause low engine power problems and potentially cause emission/sociability issues. The term leakage, as used herein, is defined as a loss of compression pressure within an engine cylinder due to, for example, damaged rings, burned valves, cracked cylinder liners, etc. Such leakage can lead to less effective work extraction from the combustion gases, or worse yet, incomplete combustion or no combustion at all under certain operating conditions, such as light load or low idle.

Since such leakage problems are not related to the engine fuel system, cranking the engine without fueling can provide essential information enabling one to detect the leakage. The present invention defines a method and apparatus allowing one to extract such information from an internal combustion engine in order to detect individual cylinder compression problems. Using the measurement of engine speed fluctuations from an appropriate source such as the camshaft gear, a tonewheel on the crankshaft, the flywheel itself, etc., while cranking the engine without fueling, the present invention is able to detect individual cylinder compression problems by post processing of the measured data and comparing this with a predetermined criterion. The present invention provides a good indication of a leaking cylinder and comparison of the relative compression balance between cylinders against the relative compression balance predetermined for an engine in new condition may be used to estimate the precentage loss of compression in the leaking cylinder.

FIG. 1 illustrates an experimental test setup useful in illustrating the concepts of the present invention. An engine, such as a 6-cylinder engine 10, is modified to create a leakage in Cylinder No. 6 by drilling a hole 12 into the cylinder head, such hole having an orifice of controlled diameter in order to simulate various degrees of compression leakage. Using an appropriate speed sensor, a PC controller 14 is operative to measure the speed of the engine 10 camshaft gear 16 (in an actual application, the function of the PC controller 14 would be performed by the electronic engine module (EEM) used to control the engine). Additionally, a high-speed data acquisition (HSDA) card 18 is used to measure the speed of the engine and flywheel 20 via an appropriate sensor. In order to correlate the results of the present invention with engine compression leakage measurements made by conventional means, pressure transducers 22 are installed into Cylinder No. 1 and Cylinder No. 6, and data from these pressure transducers 22 is measured by the HSDA card 18.

Figure 2:
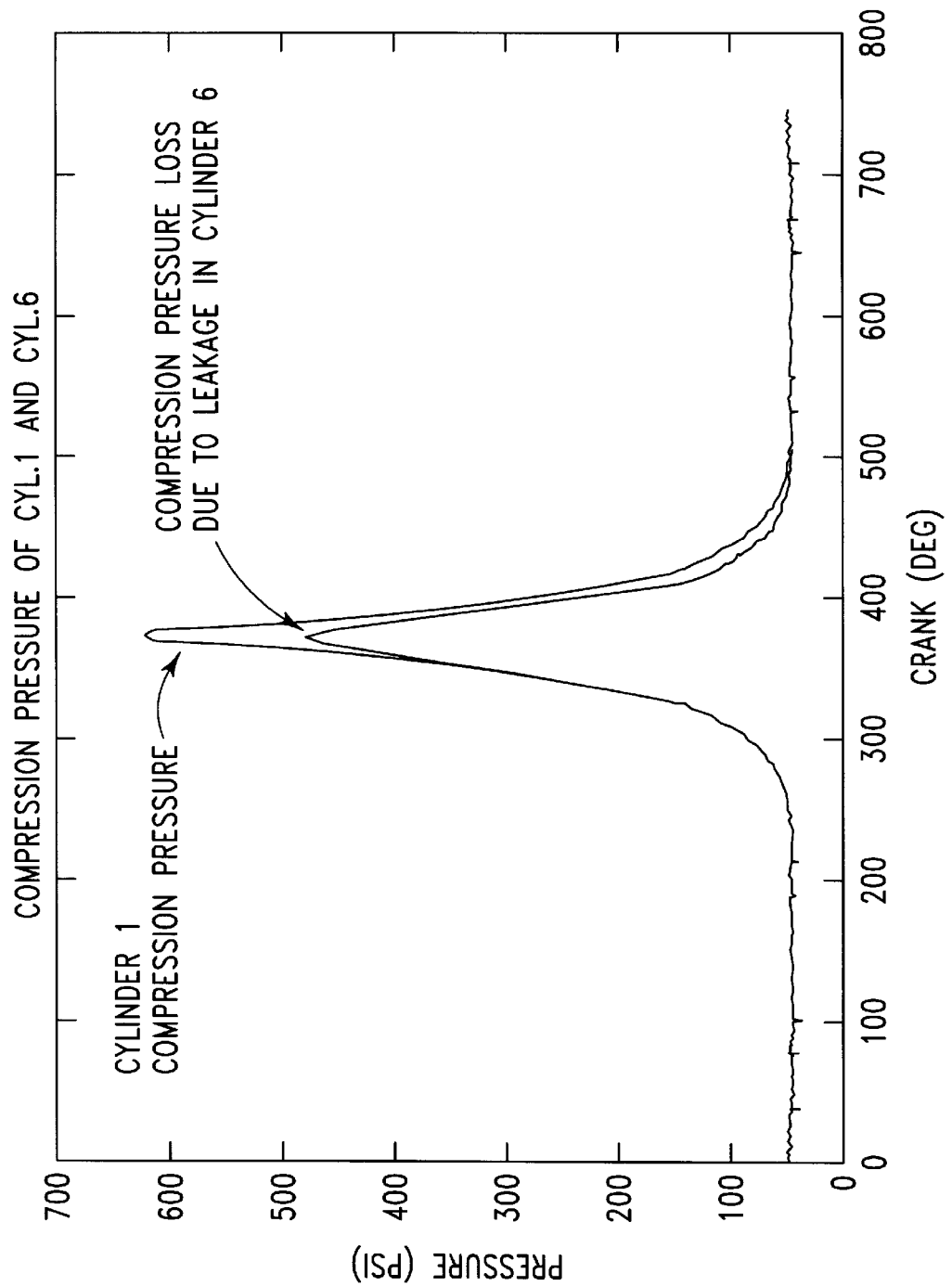
FIG. 2 is a graph of cylinder pressure versus crank position for two engine cylinders, illustrating a loss of cylinder pressure due to a leakage in one cylinder.

With the orifice 12 drilled to a 0.088" diameter, and using an M11 diesel engine available from Cummins Engine Company of Columbus, Indiana as the engine 10, the graph of FIG. 2 clearly indicates that Cylinder No. 6 is exhibiting significant compression pressure loss due to the orifice 12 formed into the cylinder head. The data in FIG. 2 was taken using the pressure transducers 22.

Figure 3:
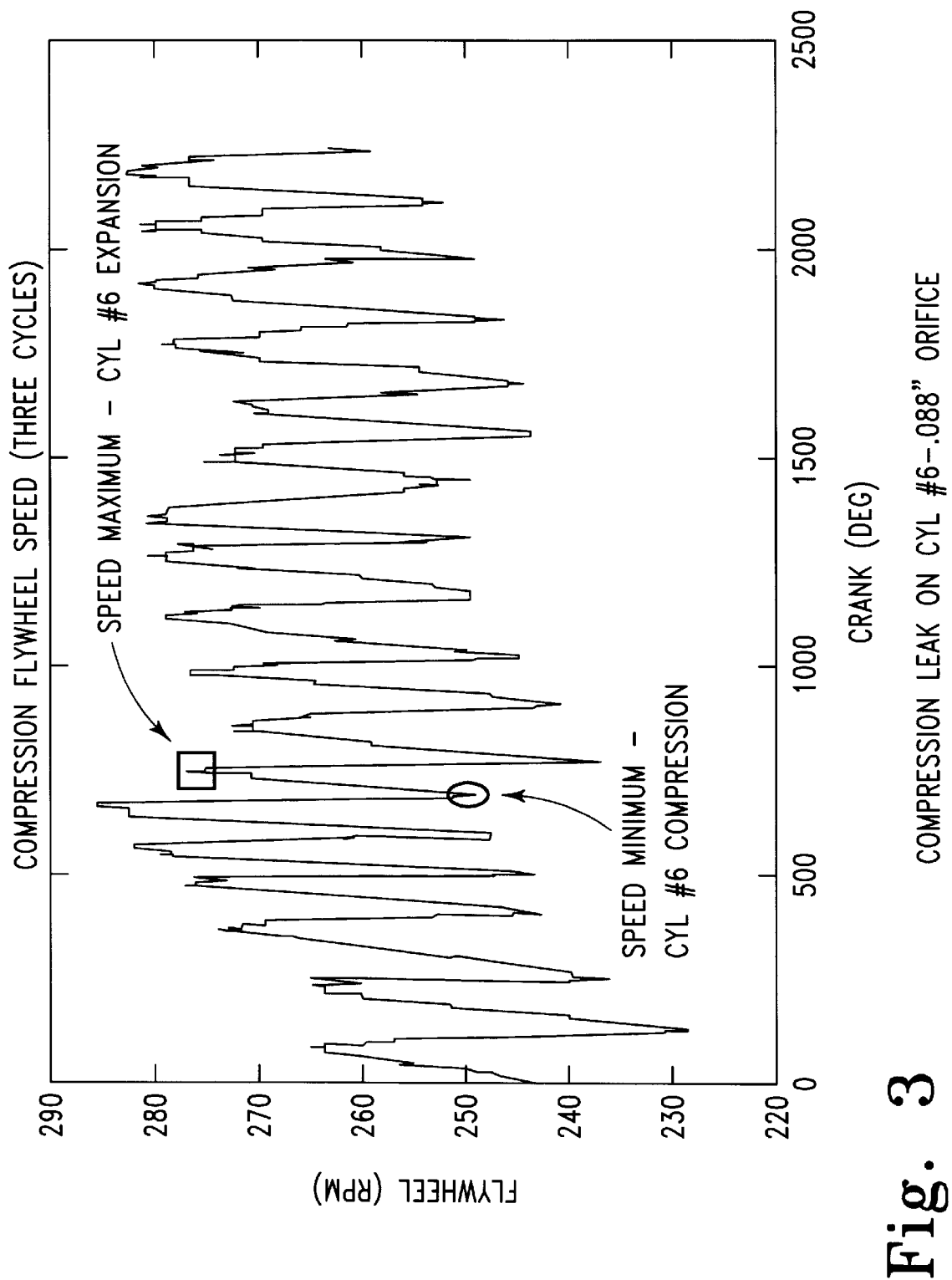
FIG. 3 is a graph of flywheel speed versus crank position for three consecutive engine cycles.

Referring now to FIG. 3, there is illustrated three complete engine cycles of the engine flywheel 20 speed measured while cranking the engine 10 with no fuel injection taking place. At individual cylinder top dead center (TDC) firing locations, the compression pressure within the cylinder reaches a maximum, resulting in a speed minimum of the flywheel 20. Because Cylinder No. 6 has leakage caused by the orifice 12, the compression pressure at TDC firing in Cylinder No. 6 is less than that of the other cylinders, resulting in less of a speed drop, which is marked by the circle in FIG. 3. In other words, the speed drop in Cylinder No. 6 is less than that resulting from compression in the other cylinders. Likewise, the speed recovery (increase) resulting from the expansion of gases in Cylinder No. 6 is significantly less than that of the other cylinders, because of the energy lost to compression leakage through the orifice 12. The data in FIG. 3 were recorded when cranking speed of the engine 10 reached steady state on an average total cycle speed basis. To reduce the effect of measurement noise, the speed data was averaged in the time domain, cycle-by-cycle.

Figure 4:
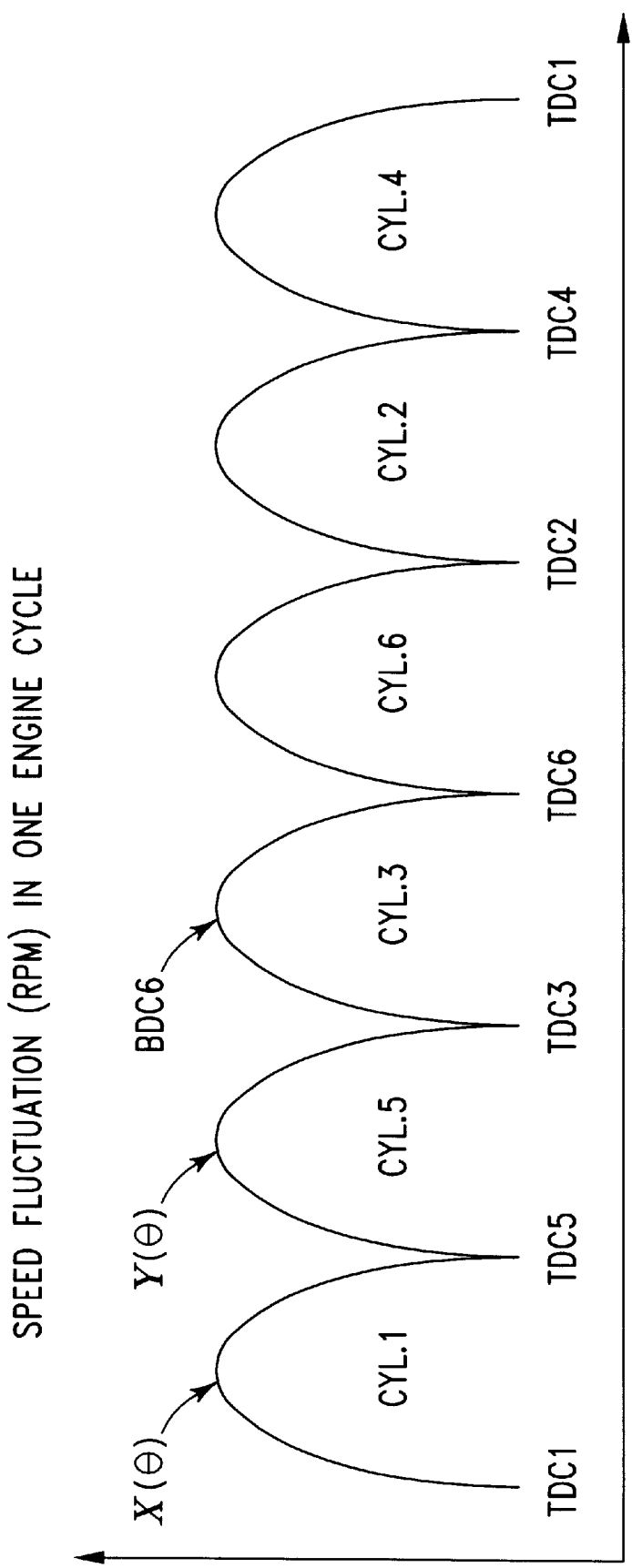
FIG. 4 is a graph of idealized cylinder speed fluctuation versus crank position for one complete engine cycle.

In order to estimate the relative cylinder compression balance of the engine 10, two vectors are defined as shown in FIG. 4. FIG. 4 is a theoretical graph of engine speed (as measured at the flywheel, camshaft gear, etc.) versus engine crankshaft position. The defined vectors are $X(\theta)$ and $Y(\theta)$, where $$X(\theta) = [x_1, x_2 \ldots x_n],$$

is a vector consisting of the series of speed measurements from TDC#1 to TDC#5. This vector is defined to be the "Cylinder No. 1 Speed Fluctuation Pulse". In the same manner, $$Y(\theta) = [y_1, y_2 \ldots y_n],$$

is a vector consisting of the series of speed measurements from TDC#5 to TDC#3. This vector is defined to be the "Cylinder No. 5 Speed Fluctuation Pulse". Analogous speed fluctuation pulses may be defined for the speed measurements between the remaining pairs of cylinders.

Figure 5:
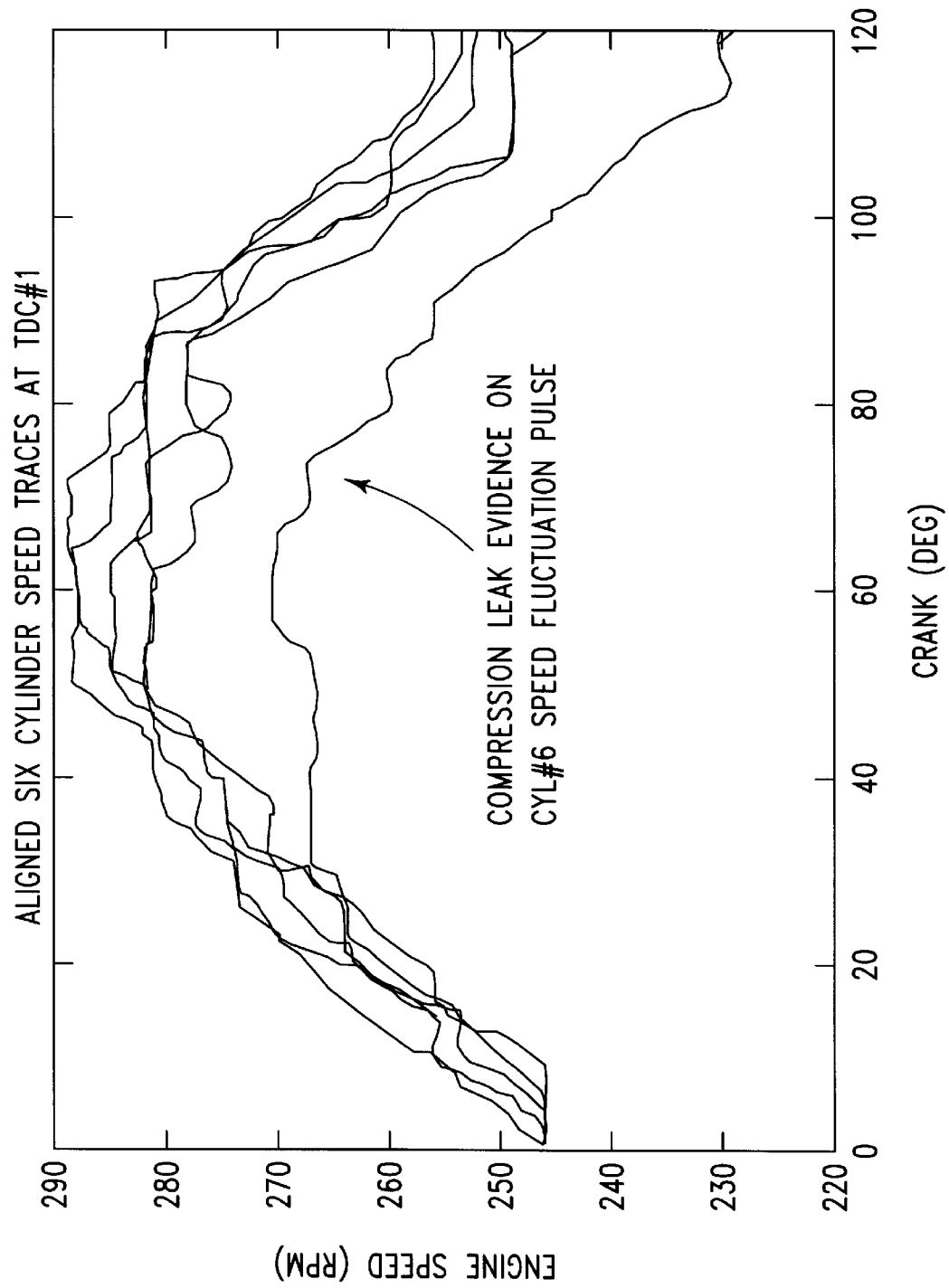
FIG. 5 is a graph of cylinder speed fluctuation pulses for six cylinders of a 6-cylinder engine, wherein all of the pulses are aligned at TDC.

FIG. 5 illustrates six such engine speed fluctuation pulses (for the 6-cylinder engine 10 of FIG. 1) in one graph, such that each of the speed fluctuation pulses are aligned at their respective TDC. In order to analyze this data for evidence of cylinder leakage, we may define a "metric distance" between adjacently firing cylinders. For example, the metric distance between Cylinder No. 1 and Cylinder No. 5 may be given as:

$$\|Cyl.1 - Cyl.5\| = \sqrt{\sum_{i=1}^{n} (x_i - y_i)^2}.$$

Table I gives the calculated metric distances between the six adjacent cylinders using data gathered from the engine 10 of FIG. 1 with the orifice 12 comprising a 0.088" orifice leakage path from the cylinder head to ambient with a coolant temperature of 75° F. Table II presents the same data when the engine 10 coolant temperature has reached 157° F.

TABLE I

Metric Distance - 0.088 inch orifice (Coolant Temp. 75° F.)

| | ‖Cyl.3 – Cyl.6‖ | ‖Cyl.6 – Cyl.2‖ | ‖Cyl.2 – Cyl.4‖ | ‖Cyl.4 – Cyl.1‖ | ‖Cyl.1 – Cyl.5‖ | ‖Cyl.5 – Cyl.3‖ |
|---|---|---|---|---|---|---|
| dist | 231 | 192 | 35 | 50 | 46 | 63 |

TABLE II

Metric Distance - 0.088 inch orifice (Coolant Temp. 157° F.)

| | ‖Cyl.3 – Cyl.6‖ | ‖Cyl.6 – Cyl.2‖ | ‖Cyl.2 – Cyl.4‖ | ‖Cyl.4 – Cyl.1‖ | ‖Cyl.1 – Cyl.5‖ | ‖Cyl.5 – Cyl.3‖ |
|---|---|---|---|---|---|---|
| dist | 240 | 181 | 21 | 25 | 28 | 51 |

As can be readily seen from Tables I and II, Cylinder No. 6 has a significantly larger metric distance from its adjacent cylinders, by a factor of about 6, compared with the nominal, non-leaking cylinders. Therefore, determination of the metric distance between cylinders clearly identifies the fact that there is a compression leakage at Cylinder No. 6. In practice, the threshold of compression leakage that will be identified by this method can be made calibratable. In order words, metric distances exceeding a predetermined threshold may be flagged as evidence of a cylinder leakage problem. Also, it is not necessary to define the speed fluctuation pulses from TDC to TDC between adjacently firing cylinders, so long as the same point in each cylinder's travel is used as the pulse endpoints.

Calculation of the metric distance of the speed fluctuation pulses as discussed hereinabove can clearly qualitatively indicate a cylinder leakage problem; however, it is often desirable to have a quantifiable indication of how much leakage is occurring within the cylinder. The degree to which the individual cylinder speed fluctuation pulses are distorted, as shown in FIG. 5, is almost linearly correlatable to the cylinder pressure loss due to compression leakage. If each speed fluctuation pulse is aligned at $TDC_1$–FC (as shown in FIG. 5), a measure of the power associated with the compression/expansion of a given cylinder can also be related to this speed information from that cylinder as:

$$P_{N,i} = \sum_{\theta=TDC_i-FC}^{TDC_i+FC} [N(\theta)]^2$$

i=cylinder #
N=Speed
θ=Crank Angle

FC=60°, 2×FC=Duration of Firing Cycle (120° CA for a 6-cylinder engine)

Correspondingly, the power associated with the compression/expansion of a given cylinder can also be related to the cylinder pressure from that cylinder as, $$P_{P_{cyl},i} = \sum_{\theta=TDC_i-FC}^{TDC_i+FC} [P_{cyl}(\theta)]^2$$

i=cylinder #
$P_{cyl}$=pressure
θ=Crank Angle

Because the experimental test setup of FIG. 1 provides cylinder pressure information for Cylinders 1 and 6 via the pressure transducers 22, this data can be used to compare power ratios between these two cylinders, with the power calculated using the engine speed information or with the cylinder pressure information. The above formulas were used to calculate the following power ratios from data where a compression leakage equivalent to a 0.063" orifice on Cylinder No. 6 was present:

Speed Information Based Ratio $$\left(\frac{P_{N,6}}{P_{N,1}}\right) = 0.8634$$

Cylinder Pressure Based Ratio $$\left(\frac{P_{P_{cyl},6}}{P_{P_{cyl},1}}\right) = 0.8652$$

As can be seen from these results, the compression loss estimated from the engine speed information correlates very well to the compression loss estimated from data gathered from the cylinder pressure transducers 22. Such analysis of cylinder compression power loss by use of engine speed information during cranking without fueling will therefore provide the same information without the need for the relatively expensive and cumbersome pressure transducers.

Figure 6:
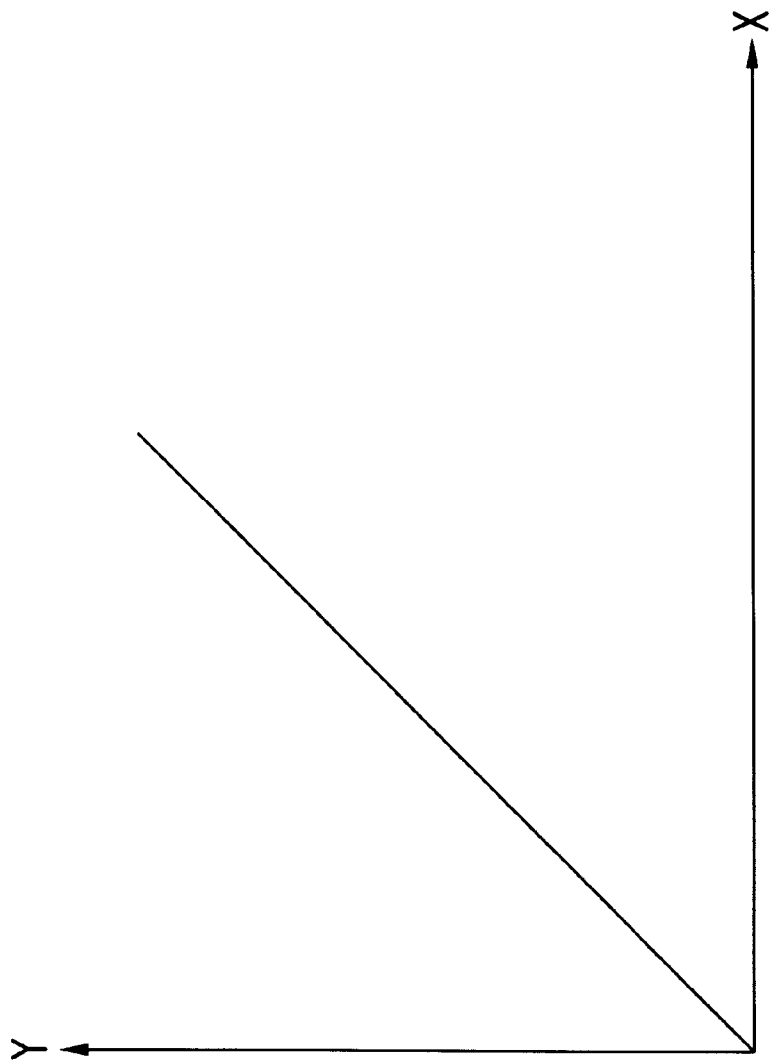
FIG. 6 is a graph illustrating the correlation between cylinder speed fluctuation pulses for two different cylinders of an idealized engine.

Referring once again to FIG. 4, the speed fluctuation pulses between adjacent firing cylinders in a theoretically idealized engine are identical. In order words, X(θ) is exactly equal to Y(θ). Since the two speed fluctuation pulses are exactly identical, we may plot the X data versus the Y data as shown in FIG. 6, resulting in a straight line. Therefore, the correlation coefficient between the vectors X(θ) and Y(θ) is equal to 1 (perfect correlation).

Any compression loss due to cylinder leakage in one of the engine cylinders will deviate the correlation coefficient of X(θ) and Y(θ) away from 1.0. We may define the correlation coefficient as:

$$\text{Corr. Coefficient } (X, Y) = \frac{\sum_{i=1}^{n}(x_i - \overline{X})\sum_{i=1}^{n}(y_i - \overline{Y})}{\sigma_x \sigma_y}$$

where $\overline{X}$ is the mean of X,
$\overline{Y}$ is the mean of Y,
$\sigma_x$ is the standard deviation of X, and
$\sigma_Y$ is the standard deviation of Y.

Therefore, for a well-balanced engine, the correlation coefficients between the 6-cylinder speed fluctuation pulses (as defined by the vectors X(θ) and Y(θ)) will be close to 1.0. Any kind of unbalanced cylinder compression loss will reduce the correlation value between cylinders.

Figure 7:
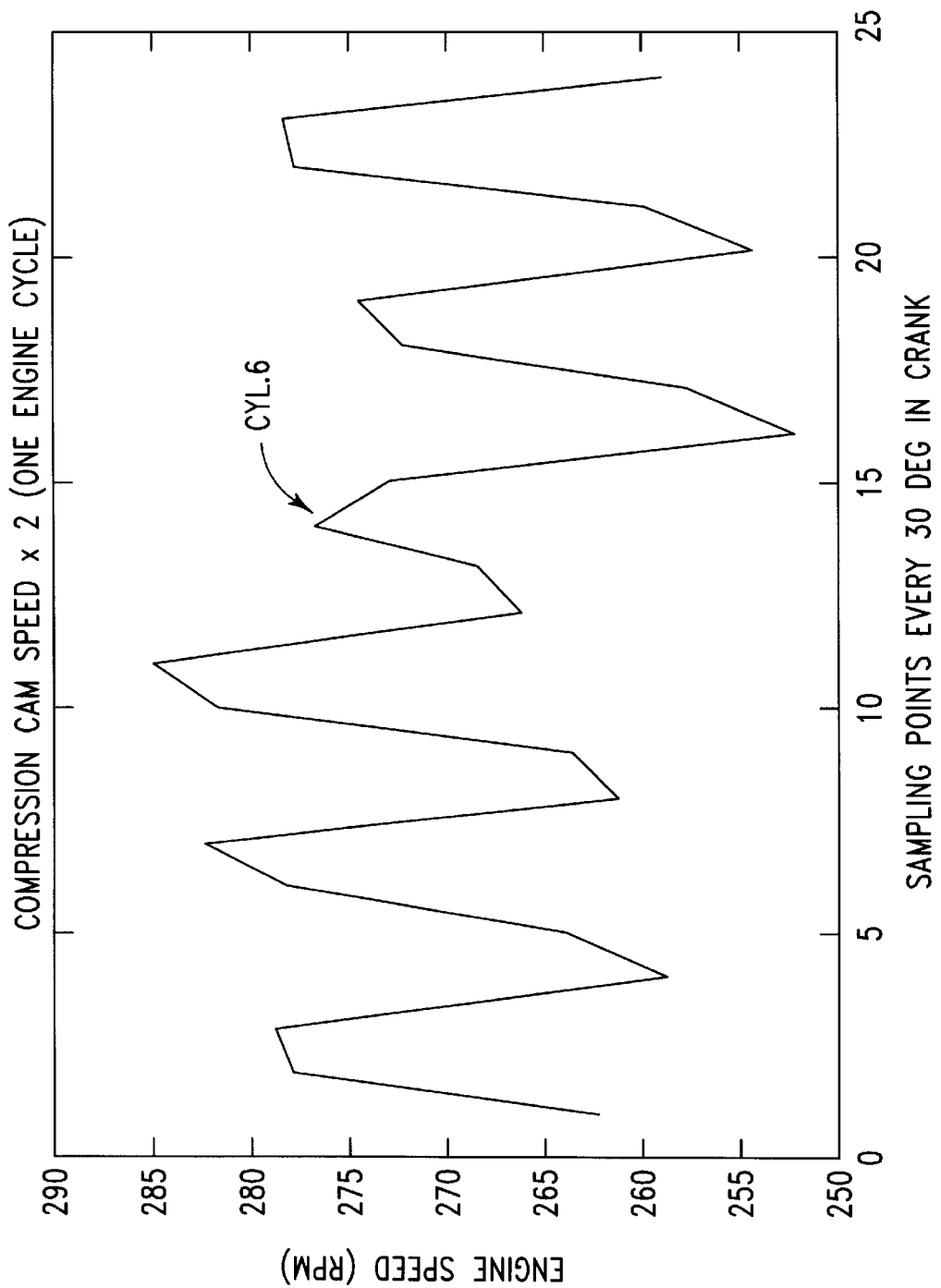
FIG. 7 is a graph of engine speed versus crank position measured by the test setup of FIG. 1 with a 0.088" diameter orifice in Cylinder No. 6.

In order to test this conclusion, the experimental test setup of FIG. 1 was utilized with the orifice 12 having a 0.088" diameter. As the engine 10 was cranking at steady state without fueling, the camshaft speed was measured by the PC controller 14. This speed was sampled uniformly at every 30 crank degrees, or 24 samples per engine cycle. To reduce noise level in the measurement, the measured speed was averaged cycle-by-cycle, which resulted in the average camshaft speed of one engine cycle that is illustrated in FIG. 7. Using the above equation, the correlation coefficients between all six cylinders were calculated using the data from FIG. 7, and are illustrated in Table III.

TABLE III

| Correlation Coefficients - 0.088 inch orifice | | | | | | |
|---|---|---|---|---|---|---|
| | Cyl.1 | Cyl.5 | Cyl.3 | Cyl.6 | Cyl.2 | Cyl.4 |
| Cyl.1 | * | 0.99 | 0.97 | 0.85 | 0.99 | 0.99 |
| Cyl.5 | 0.99 | * | 0.97 | 0.84 | 0.99 | 0.98 |
| Cyl.3 | 0.97 | 0.97 | * | 0.77 | 0.98 | 0.99 |
| Cyl.6 | 0.85 | 0.84 | 0.77 | | 0.84 | 0.77 |
| Cyl.2 | 0.99 | 0.99 | 0.98 | 0.84 | * | 0.77 |
| Cyl.4 | 0.99 | 0.98 | 0.99 | 0.76 | 0.99 | * |
| Mean | 0.99 | 0.99 | 0.98 | 0.80 | 0.99 | 0.99 |

As can be seen from the data in Table III, Cylinder No. 6 has lost correlation with the other cylinders, indicating a loss of compression balance with the rest of the cylinders. The last row in Table III is the calculated mean value of the correlation of a particular cylinder with the rest of the other cylinders. As can be seen from the table, the mean correlation coefficient of Cylinder No. 6 is 0.80, while the other cylinders are all either 0.99 or 0.98. This data clearly shows that Cylinder No. 6 is imbalanced due to a compression loss in that cylinder. The smaller the correlation coefficient, the more imbalanced the cylinder is from the remaining cylinders.

In a similar experiment, the data of Table IV was calculated from speed fluctuation pulse information derived from the experimental test setup of FIG. 1 with a 0.063" diameter orifice 12, using speed information from the flywheel 20.

TABLE IV

Correlation Coefficient - 0.063 INCH ORIFICE

| | Corr(C1,Ci) | Corr(C5,Ci) | Corr(C3,Ci) | Corr(C6,Ci) | Corr(C2,Ci) | Corr(C4,Ci) |
|---|---|---|---|---|---|---|
| Mean | i ≠ 1<br>0.98 | i ≠ 5<br>0.98 | i ≠ 3<br>0.98 | i ≠ 6<br>0.93 | i ≠ 2<br>0.98 | i ≠ 4<br>0.98 |

As can be seen, the mean correlation coefficient for Cylinder No. 6 is 0.93, while the mean correlation coefficient for the remaining cylinders are all 0.98, clearly indicating that Cylinder No. 6 is suffering from compression loss.

Those having ordinary skill in the art will recognize that the procedures detailed hereinabove for detecting engine cylinder leakage will provide a good service tool in order to detect the cause of engine low power complaints due to compression loss in cylinders. In addition to determining which cylinder is exhibiting compression loss, the methodologies of the present invention can also give a quantitative estimation of the amount of cylinder leakage. Additionally, this information can be used to identify worsening cylinder leakage problems for preventative service before they worsen to the state that they negatively impact vehicle performance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method for detecting cylinder compression pressure loss in an internal combustion engine, comprising the steps of:

a) cranking said engine without combustion;

b) measuring a rotational speed of said engine during n cycles of said cranking;

c) defining a first speed fluctuation pulse vector $X(\theta)$ as:

$$X(\theta)=[x_1, x_2 \ldots x_n],$$

wherein $x_1 \ldots x_n$ comprise said rotational speed measurements made between a predetermined position of a first piston of said engine and said predetermined position of a second piston;

d) defining a second speed fluctuation pulse vector $Y(\theta)$ as:

$$Y(\theta)=[y_1, y_2 \ldots y_n],$$

wherein $y_1 \ldots y_n$ comprise said rotational speed measurements made between said predetermined position of said second piston and said predetermined position of a third piston;

e) defining a third speed fluctuation pulse vector $Z(\theta)$ as:

$$Z(\theta)=[z_1, z_2 \ldots z_n],$$

wherein $z_1 \ldots z_n$ comprise said rotational speed measurements made between said predetermined position of said third piston and said predetermined position of a fourth adjacently firing piston;

f) determining a first metric distance between said first piston and said second piston as:

$$\text{said first metric distance} = \sqrt{\sum_{i=1}^{n} (x_i - y_i)^2} \; ;$$

g) determining a second metric distance between said second piston and said third piston as:

$$\text{said second metric distance} = \sqrt{\sum_{i=1}^{n} (y_i - z_i)^2} \; ;$$

and h) determining if a cylinder enclosing said second piston is exhibiting compression leakage by comparing said first and second metric distances to a predetermined threshold.

2. The method of claim 1, wherein each of said rotational speed measurements is made at a top dead center position of said respective piston.

3. The method of claim 1, wherein said second piston fires adjacent to said first piston and said third piston fires adjacent to said second piston.

4. A method for detecting cylinder compression loss in an internal combustion engine, comprising the steps of:

a) cranking said engine;

b) measuring a rotational speed of said engine during n cycles of said cranking;

c) defining a first speed fluctuation pulse vector $X(\theta)$ as:

$$X(\theta\theta)=[x_1, x_2 \ldots x_n],$$

wherein $x_1 \ldots x_n$ comprise said rotational speed measurements made between a predetermined position of a first piston of said engine and said predetermined position of a second piston;

d) defining a second speed fluctuation pulse vector $Y(\theta)$ as:

$$Y(\theta)=[y_1, y_2 \ldots y_n],$$

wherein $y_1 \ldots y_n$ comprise said rotational speed measurements made between said predetermined position of said second piston and said predetermined position of a third piston;

e) defining a third speed fluctuation pulse vector $Z(\theta)$ as:

$$Z(\theta)=[z_1, z_2 \ldots z_n],$$

wherein $z_1 \ldots z_n$ comprise said rotational speed measurements made between said predetermined position of said third piston and said predetermined position of a fourth adjacently firing piston;

f) determining a first metric distance between said first piston and said second piston as:

$$\text{said first metric distance} = \sqrt{\sum_{i=1}^{n}(x_i - y_i)^2};$$

g) determining a second metric distance between said second piston and said third piston as:

$$\text{said second metric distance} = \sqrt{\sum_{i=1}^{n}(y_i - z_i)^2}; \text{ and}$$

h) determining if a cylinder enclosing said second piston is exhibiting compression leakage by comparing said first and second metric distances to a predetermined threshold.

5. The method of claim 4, wherein each of said rotational speed measurements is made at a top dead center position of said respective piston.

6. The method of claim 4, wherein said second piston fires adjacent to said first piston and said third piston fires adjacent to said second piston.

7. A method for detecting cylinder compression pressure loss in an internal combustion engine, comprising the steps of:

a) cranking said engine without combustion;
b) measuring a rotational speed of said engine during n cycles of said cranking;
c) defining a first speed fluctuation pulse vector $X(\theta)$ as:

$$X(\theta) = [x_1, x_2, \ldots x_n],$$

wherein $x_1 \ldots x_n$ comprise said rotational speed measurements made between a predetermined position of a first piston of said engine and said predetermined position of a second piston;

d) defining a second speed fluctuation pulse vector $Y(\theta)$ as:

$$Y(\theta) = [y_1, y_2, \ldots y_n]$$

wherein $y_1 \ldots y_n$ comprise said rotational speed measurements made between said predetermined position of said second position and said predetermined position of a third piston;

e) determining a metric distance between said first piston and said second piston as:

$$\text{metric distance} = \sqrt{\sum_{i=1}^{n}(x_i - y_i)^2}; \text{ and}$$

f) determining if a first cylinder enclosing said first piston or a second cylinder enclosing said second piston is exhibiting compression leakage by comparing said metric distance to a predetermined threshold.

8. The method of claim 7, wherein each of said rotational speed measurements is made at a top dead center position of said respective piston.

9. The method of claim 7, wherein said second piston fires adjacent to said first piston.

10. A method for detecting cylinder compression pressure loss in an internal combustion engine, comprising the steps of:

a) cranking said engine without combustion;
b) measuring a rotational speed of said engine during n cycles of said cranking;
c) defining a first speed fluctuation pulse vector $X(\theta)$ as:

$$X(\theta) = [x_1, x_2, \ldots x_n],$$

wherein $x_1 \ldots x_n$ comprise said rotational speed measurements made between a predetermined position of a first piston of said engine and said predetermined position of a second piston;

d) defining a second speed fluctuation pulse vector $Y(\theta)$ as:

$$Y(\theta) = [y_1, y_2, \ldots y_n]$$

wherein $y_1 \ldots y_n$ comprise said rotational speed measurements made between said predetermined position of said second position and said predetermined position of a third piston;

e) determining $\overline{X}$ as the mean of $X(\theta)$;
f) determining $\overline{Y}$ as the mean of $Y(\theta)$;
g) determining $\sigma_x$ the standard deviation of $X(\theta)$;
h) determining $\sigma_Y$ as the standard deviation of $Y(\theta)$;
i) determining a correlation coefficient of $X(\theta)$ and $Y(\theta)$ as:

$$\text{Corr. Coefficient } (X, Y) = \frac{\sum_{i=1}^{n}(x_i - \overline{X})\sum_{i=1}^{n}(y_i - \overline{Y})}{\sigma_x \sigma_y};$$

and j) determining if a first cylinder enclosing said first piston or a second cylinder enclosing said second piston is exhibiting compression leakage by comparing said correlation coefficient to 1.0.

11. The method of claim 10, wherein each of said rotational speed measurements is made at a top dead center position of said respective piston.

12. The method of claim 10, wherein said second piston fires adjacent to said first piston.

13. A method for detecting cylinder compression pressure loss in an internal combustion engine, comprising the steps of:

a) cranking said engine without combustion;
b) measuring a rotational speed of said engine during n cycles of said cranking;
c) defining a first speed fluctuation pulse vector $X(\theta)$ as:

$$X(\theta) = [x_1, x_2, \ldots x_n]$$

wherein $x_1 \ldots x_n$ comprise said rotational speed measurements made between a predetermined position of a first piston of said engine and said predetermined position of a second piston;

d) defining a second speed fluctuation pulse vector $Y(\theta)$ as:

$$Y(\theta) = [y_1, y_2, \ldots y_n]$$

wherein $y_1 \ldots y_n$ speed measurements made between said predetermined position and said predetermined position of a third piston;

e) determining a correlation coefficient of $X(\theta)$ and $Y(\theta)$; and f) determining if a first cylinder enclosing said first piston or a second cylinder enclosing said second piston is exhibiting compression leakage by comparing said correlation coefficient to 1.0.

14. The method of claim 13, wherein each of said rotational speed measurements is made at a top dead center of said respective piston.

15. The method of claim 13, wherein said second piston fires adjacent to said first piston.

* * * * *

UNITED STATES PATENT AND TRADEMARK OFFICE
CERTIFICATE OF CORRECTION

PATENT NO. : 6,055,852
DATED : May 2, 2000
INVENTOR(S) : Wang et al.

Page 1 of 1

It is certified that error appears in the above-identified patent and that said Letters Patent is hereby corrected as shown below:

Title page,
Item [75], please add "Dennis O. Taylor" as an inventor.

Column 2,
Lines 47 and 48, please change "Z" to -- z --.

Column 10,
Line 43, please change "(θ0)" to -- (θ) --.

Column 12,
Line 65, after "$y_n$", please insert -- comprise said rotational --.
Line 66, after first occurrence of "position", please insert -- of said second position --.

Column 14,
Line 2, after "center", please insert -- position --.

Signed and Sealed this

Fifteenth Day of January, 2002

Attest:

Attesting Officer

JAMES E. ROGAN
Director of the United States Patent and Trademark Office